United States Patent
Liu

(10) Patent No.: US 9,549,423 B2
(45) Date of Patent: Jan. 17, 2017

(54) METHOD AND DEVICE FOR INCREASING GATEWAY CAPACITY IN LTE MODE FEMTO CELL SYSTEM

(71) Applicant: ZTE Corporation, Shenzhen (CN)

(72) Inventor: Jun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/431,958

(22) PCT Filed: Sep. 27, 2013

(86) PCT No.: PCT/CN2013/084414
§ 371 (c)(1),
(2) Date: Mar. 27, 2015

(87) PCT Pub. No.: WO2014/048360
PCT Pub. Date: Apr. 3, 2014

(65) Prior Publication Data
US 2015/0296547 A1 Oct. 15, 2015

(30) Foreign Application Priority Data
Sep. 28, 2012 (CN) .......................... 2012 1 0370493

(51) Int. Cl.
*H04W 76/02* (2009.01)
*H04W 16/26* (2009.01)
(Continued)

(52) U.S. Cl.
CPC .......... *H04W 76/021* (2013.01); *H04W 16/26* (2013.01); *H04W 16/32* (2013.01);
(Continued)

(58) Field of Classification Search
CPC .. H04W 76/021; H04W 76/022; H04W 88/16; H04W 16/26; H04W 16/32; H04W 92/14
(Continued)

(56) References Cited

U.S. PATENT DOCUMENTS

| 8,504,055 B2 | 8/2013 | Vikberg et al. |
| 2013/0136078 A1* | 5/2013 | Bucknell ............... H04W 28/06 370/329 |

FOREIGN PATENT DOCUMENTS

| CN | 101909369 A | 12/2010 |
| CN | 102026308 A | 4/2011 |

(Continued)

OTHER PUBLICATIONS

PCT International Search Report for PCT Application No. PCT/CN2013/084414 mailed Jan. 2, 2014 (2 pages).
(Continued)

*Primary Examiner* — Sam Bhattacharya
(74) *Attorney, Agent, or Firm* — Sutherland Asbill & Brennan LLP

(57) ABSTRACT

A method for increasing gateway capability in a long term evolution system (LTE) standard Femto cell system comprises: a gateway (HeNB GW) determining that multiple S1 links are required to be established between the HeNB GW and a single mobility management entity (MME); the HeNB GW setting different Global eNB identifiers (Global eNB IDs) for each S1 link required to be established, and initiating an S1 setup request to the single MME respectively, carrying S1 application configuration information at the same time; and the HeNB GW establishing multiple S1 links between the HeNB GW and the single MME based on the S1 setup request and the S1 application configuration information.

16 Claims, 4 Drawing Sheets

(51) Int. Cl.
    *H04W 16/32*    (2009.01)
    *H04W 88/16*    (2009.01)
    *H04W 92/14*    (2009.01)

(52) U.S. Cl.
    CPC .......... *H04W 76/022* (2013.01); *H04W 88/16* (2013.01); *H04W 92/14* (2013.01)

(58) Field of Classification Search
    USPC ..... 455/449, 450, 452.1; 370/252, 328, 329, 370/465
    See application file for complete search history.

(56) References Cited

FOREIGN PATENT DOCUMENTS

| | | |
|---|---|---|
| CN | 102223705 A | 10/2011 |
| WO | 2010/047647 A1 | 4/2010 |
| WO | 2011/124441 A1 | 10/2011 |

OTHER PUBLICATIONS

European Search Report for EP Application No. 13842408.0 mailed Dec. 7, 2015 (9 pages).

Institute for Information Industry (III) et al., "Investigating Head-of-Line Blocking Issue Among Four Relay Alternatives," 3GPP Draft; R3-092735 Relay Hold, 3rd Generation Partnership Project (3GPP) Mobile Competence Centre, 2009, XP050392238.

"3rd Generation Partnership Project; Technical Specification Group Radio Access Network; Evolved Universal Terrestrial Radio Access (E-UTRA) and Evolved Universal Terrestrial Radio Access network (E-UTRAN); Overall Description; Stage 2 (Release 11)," 3GPP Draft; 3rd Generation Partnership Project (3GPP), Mobile Competence Centre, 2012, XP050664280.

"3rd Generation Partnership Project; Technical Specification Group Radio Access Network; Evolved Universal Terrestrial Radio Access (E-UTRA) and Evolved Universal Terrestrial Radio Access network (E-UTRAN); Overall Description; Stage 2 (Release 9)," 3GPP Draft; 3rd Generation Partnership Project (3GPP), Mobile Competence Centre, 2010, XP050402561.

3GPP: "3rd Generation Partnership Project; Technical Specification Group Radio Access Network; Home (e)NodeB; getwork Aspects (Release 8)," 3GPP Draft; 3rd Generation Partnership Project (3GPP), Mobile Competence Centre; 2008, XP050324622.

Japanese Office Action for JP Application No. 2015-533439 mailed Apr. 5, 2016 (3 pages).

"Summary of Discussion on Concentrator Function for HeNB," 2008, 3GPP TSG-RAN WG3 #61, Jeju Island, Korea (4 pages).

"3rd Generation Partnership Project; Technical Specification Group Radio Access Network; Evolved Universal Terrestrial Radio Access Network (E-UTRAN); S1 General Aspects and Principles (Release 10)," 3GPP TS 36.410 V10.3.0 (Jun. 2012).

"3rd Generation Partnership Project; Technical Specification Group Radio Access Network; Evolved Universal Terrestrial Radio Access Network (E-UTRAN); S1 Application Protocol (S1AP) (Release 11)," 3GPP TS 36.413 V11.1.0 (Sep. 2012).

\* cited by examiner

METHOD AND DEVICE FOR INCREASING GATEWAY CAPACITY IN LTE MODE FEMTO CELL SYSTEM

CROSS REFERENCE TO RELATED APPLICATIONS

This application claims the priority benefit of PCT/CN2013/084414 filed on Sep. 27, 2013 and Chinese Application No. 201210370493.9 filed on Sep. 28, 2012. The contents of these applications are hereby incorporated by reference in their entirety

TECHNICAL FIELD

The present document relates to the Femto cell technology field in the mobile
communication, and in particular, to a method and apparatus for increasing gateway capability in an LTE standard Femto cell system.

BACKGROUND

The English abbreviation and its explanation involved in the present text are as follows.
  3G: the 3rd-Generation mobile communication technology;
  LTE: the Long Term Evolution system;
  GSM: the Global System of Mobile Communication system;
  EPC: the Evolved Packet Core;
  eNB, eNodeb: the Evolved Node B (the evolved base station);
  E-URTAN: the Evolved Universal Terrestrial Radio Access Network;
  UE: the User Equipment (the user terminal);
  MME: the Mobility Management Entity, which is a core network element related to mainly processing the signaling;
  S GW: the Serving Gateway, which is a core network element related to mainly processing the service;
  Femto: the Femto cell system, mainly including the Femto base station and the Femto gateway;
  HNB: the Home Node B, the Femto base station using the 3G mode;
  HeNB: the Home eNB, the Femto base station using the LTE mode;
  HeNB GW: the Home eNB Gateway (HeNB gateway);
  SCTP: the Stream Control Transmission Protocol;
  TAC: the Tracking Area Code;
  CSG: the Closed Subscriber Group;
  PLMN: the Public Land Mobile Network;
  HeMS: the Home eNB management system;
  Global eNB ID, the global network eNB identifier;
  AP: the Access Point.

The LTE system is the evolution of the 3rd generation mobile communication system, and the whole LTE system is made up of three parts, the eNB, the EPC and the UE. FIG. 1 shows a network structure chart of a LTE system. The eNB is an evolved base station, the EPC is responsible for the part of the core network, including the MME and the S GW, and the UE is the user terminal, wherein, multiple eNBs at the E-URTAN side access the MME/S-GW through the S1 interface, and every eNB is connected to one another through the X2 interface.

With the continuous extension of the scale of the macro network (the 3G network or the LTE network), the user quantity is increasing constantly, and the requirement on data bandwidth of the user is increased constantly. Because the utilization frequency of the 3G network and the LTE network is higher, and compared with the GSM, the penetrability of its signal is poor, the indoor coverage becomes a difficult point of the network optimization, and the indoor coverage of the 3G network or the LTE network is generally realized by adopting the mode of establishing the indoor distribution system. However, under the existing condition, the indoor distribution system can generally be established only in some hotels, medium-to-high grade communities or public hot places. As to the general residential quarters, limited to various conditions, it is unable to establish the indoor distribution system, so the indoor 3G or LTE signal is very weak or even there is no signal at all, which causes great influence to user experience.

For this reason, a Femto system has already been proposed, that is, the Femto cell system. Its adopted public broadband or operator transmission access is to access the security gateway and the core network of the operator through the Internet, thus providing the wireless signal coverage to the user, which can improve the user experience and is an important technology to make up for the blind points and the hot points of the indoor coverage. About the Femto system, it is mainly made up of the Femto base station and the femto gateway, wherein, the Femto base station is divided into the Femto base station using the 3G standard and the Femto base station HeNB using the LTE standard according to the difference of its adopted wireless technologies.

FIG. 2 shows a network element structure diagram of a Femto system of the LTE standard. The HeNB GW is introduced in the LTE system, and multiple HeNBs are linked to the HeNB GW. First of all, the HeNB GW is one-to-multiple connected to multiple HeNBs through S1 links; secondly, the HeNB GW is further one-to-multiple accessed to multiple MME/S-GWs through S1 links to perform the load sharing and the disaster recovery backup. In addition, the HeNB can also be accessed to the MME/S-GW through the S1 directly. Other network elements of the Femto system of the LTE standard also include the HeMS (not shown in FIG. 2) for configuring the related parameters of the HeNB.

As to the macro network base station eNB, the current protocol (36413) stipulates that the S1 message between the eNB and the MME only supports maximum 256 tracking area codes (TACs), maximum 256 closed subscriber groups (CSGs) and maximum 6 public land mobile networks (PLMNs). Under the situation that the cell number is limited, the maximum values stipulated by the protocol in the macro network eNB system will not generate the problem.

But for the Femto base station HeNB, after introducing the HeNB GW, the HeNB GW is a macro network eNB in the view of the MME. There is only one S1 link between one macro network eNB and a single MME/S-GW, while there may be tens of thousands of or even hundreds of thousands of HeNBs which are linked under one HeNB GW, and now the above-mentioned maximum values stipulated by the original protocol cannot by far meet the networking requirement. The typical situation is that, after introducing the HeNB GW, the number of the HeNBs hung under the HeNB GW is large, but the usable resources are limited, and the situation may happen that the TAC(8)/CSG(8) of a certain HeNB under the HeNB GW is not reported in the message to the MME. Because the paging message is paged according to the TAC/CSG, if the MME does not receive the message about the TAC(8)/CSG(8), it may think that there is no cell of which the TAC is 8 and the CSG is 8 under the HeNB GW, then the paging message used for the TAC as 8 and the CSG as 8 would not be issued to the HeNB GW, and the users in the cell will never receive the paging message.

SUMMARY

In order to solve the problem that the capacity of the HeNB GW is unable to meet the real networking requirement in the related art, the present document provides a method and apparatus for increasing the capacity of the gateway in a Femto cell system of the LTE standard.

On one hand, the method for increasing gateway capability in a long term evolution system (LTE) standard Femto cell system of the present document comprises: a gateway (HeNB GW) determining that multiple S1 links are required to be established between the HeNB GW and a single mobility management entity (MME); the HeNB GW setting different Global eNB identifiers (Global eNB IDs) for each S1 link required to be established, and initiating an S1 setup request to the single MME respectively, and carrying S1 application configuration information at the same time; and the HeNB GW establishing multiple S1 links between the HeNB GW and the single MME based on the S1 setup request and the S1 application configuration information.

Preferably, the number of the multiple S1 links required to be established can be determined according to an existing network planning, and also the number of the multiple S1 links required to be established can be determined according to real-time or regular system statistical data.

Preferably, after determining the number of the multiple S1 links required to be established currently according to the statistical data of the system at this time, through adding new S1 links, deleting adding or modifying the multiple S1 links between the HeNB GW and the MME established previously, the number of the multiple S1 links required currently is formed.

Preferably, limited S1 links in the multiple S1 links are established on different stream control transmission protocols (SCTPs) or established on different streams born by one same SCTP.

On another hand, the apparatus for increasing gateway capability in a long term evolution system (LTE) standard Femto cell system of the present document comprises: an S1 link number determination module, configured to: make a gateway (HeNB GW) determine that multiple S1 links are required to be established between the HeNB GW and a single mobility management entity (MME); an S1 link request module, configured to: make the HeNB GW set different Global eNB identifiers (Global eNB IDs) for each S1 link required to be established, and initiate an S1 setup request to the single MME respectively, and carry S1 application configuration information at the same time; and an S1 link establishment module, configured to: make the HeNB GW establish multiple S1 links between the HeNB GW and the single MME based on the S1 setup request and the S1 application configuration information.

PREFERRED EMBODIMENTS OF THE PRESENT DOCUMENT

The present document is further described in detail with reference to the accompanying drawings and embodiments hereinafter. It should be understood that, the embodiments illustrated hereinafter are used to describe and explain the present document, rather than constituting a limitation to the present document.

Figure 1:
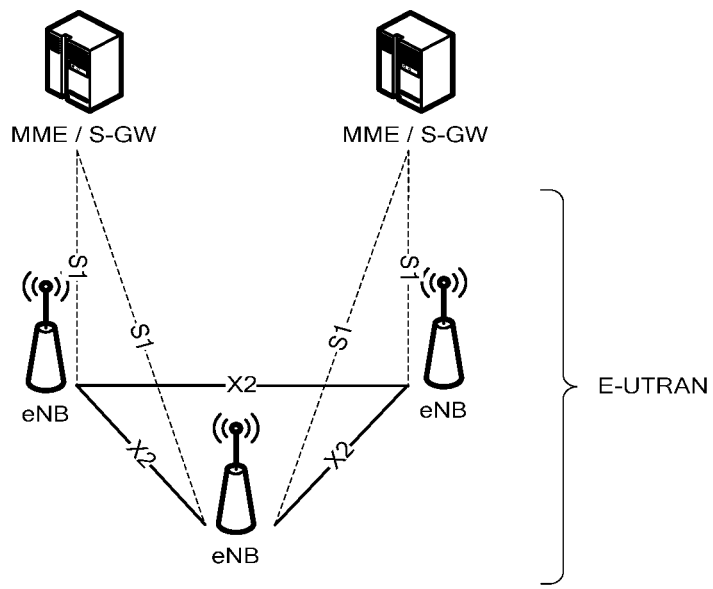
FIG. 1 is a network framework diagram of an LTE system in the related art.
Figure 2:
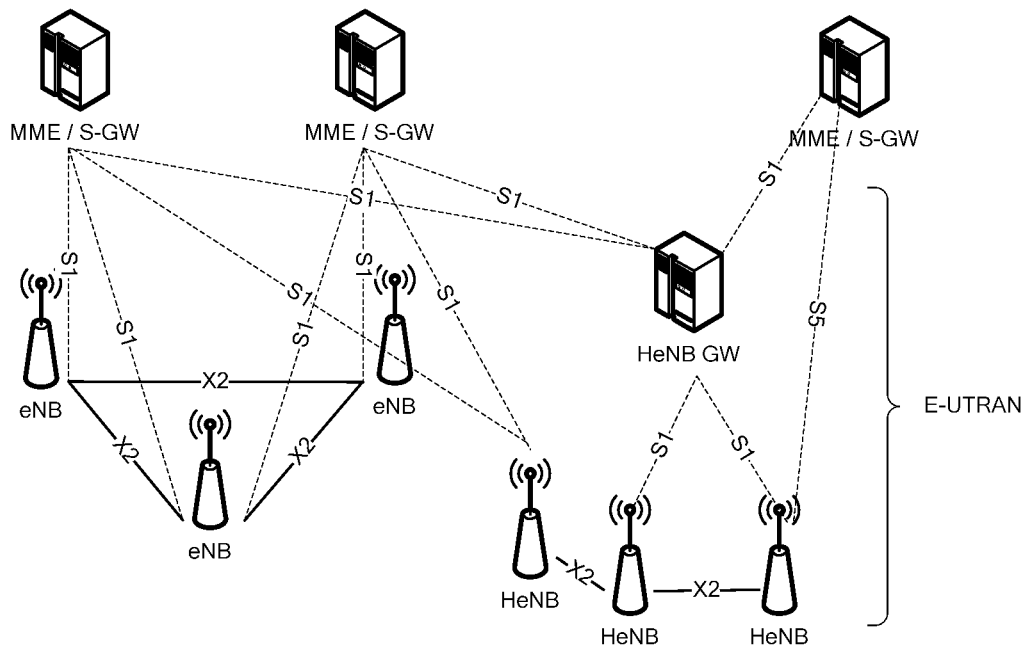
FIG. 2 is a diagram of a Femto system framework of an LTE standard in the related art.

In the Femto system framework of the LTE standard in FIG. 2, it can be seen from the connection relation of every network element, as to the MME, the HeNB GW is equivalent to the macro station eNB; as to the HeNB, the HeNB GW is equivalent to the MME, so no matter the HeNB is linked with the MME/S-GW directly, or the HeNB is linked with the MME/S-GW through the HeNB GW, the definition and function of the S1 interface during that time are totally consistent. In order to make the capacity of the HeNB GW no longer be limited to the number of the TAC, the CSG and the PLMN stipulated by the protocol, the present document provides a method for increasing the capacity of the gateway HeNB GW in the LTE standard Femto system, which expands the HeNB GW capacity through establishing multiple S1 links between the HeNB GW and the MME.

Figure 3:
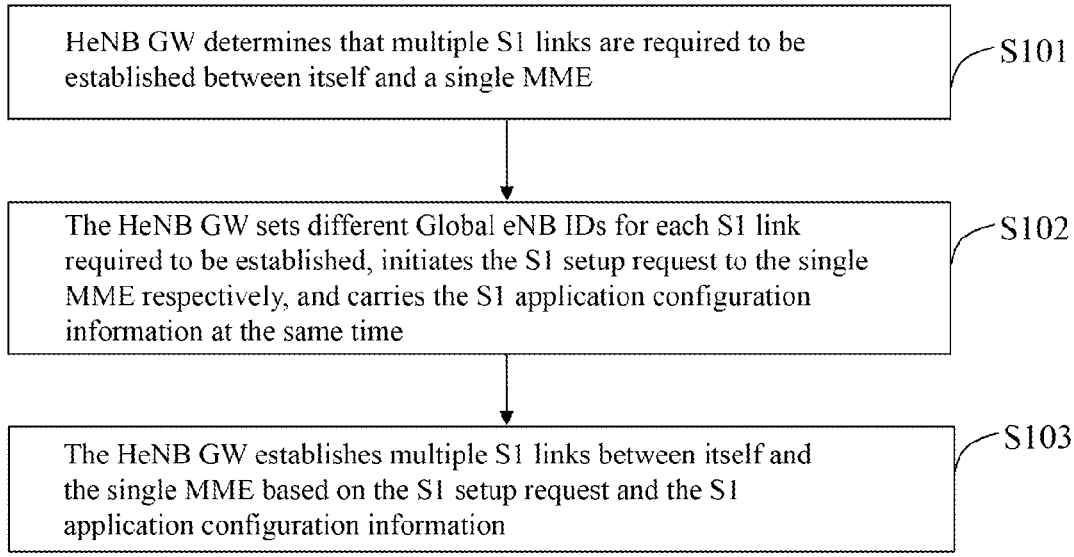
FIG. 3 is a flow chart of a method for increasing gateway capability in an LTE standard Femto cell system of the present document.

Specifically, as shown in FIG. 3, in S101, the HeNB GW of the present document determines the number of the S1 links required to be established with the single MME at first; in S102, the HeNB GW sets different Global eNB IDs for each S1 link required to be established under the single MME, initiates the S1 setup request to the MME respectively, and carries the S1 application configuration information at the same time; in S103, the HeNB GW establishes multiple S1 links between itself and the single MME based on the S1 setup request and the S1 application configuration information. Each S1 link can be used for transmitting the S1 message, which can avoid packet loss, actually expands the HeNB GW capacity, and improves the system performance.

Figure 4:
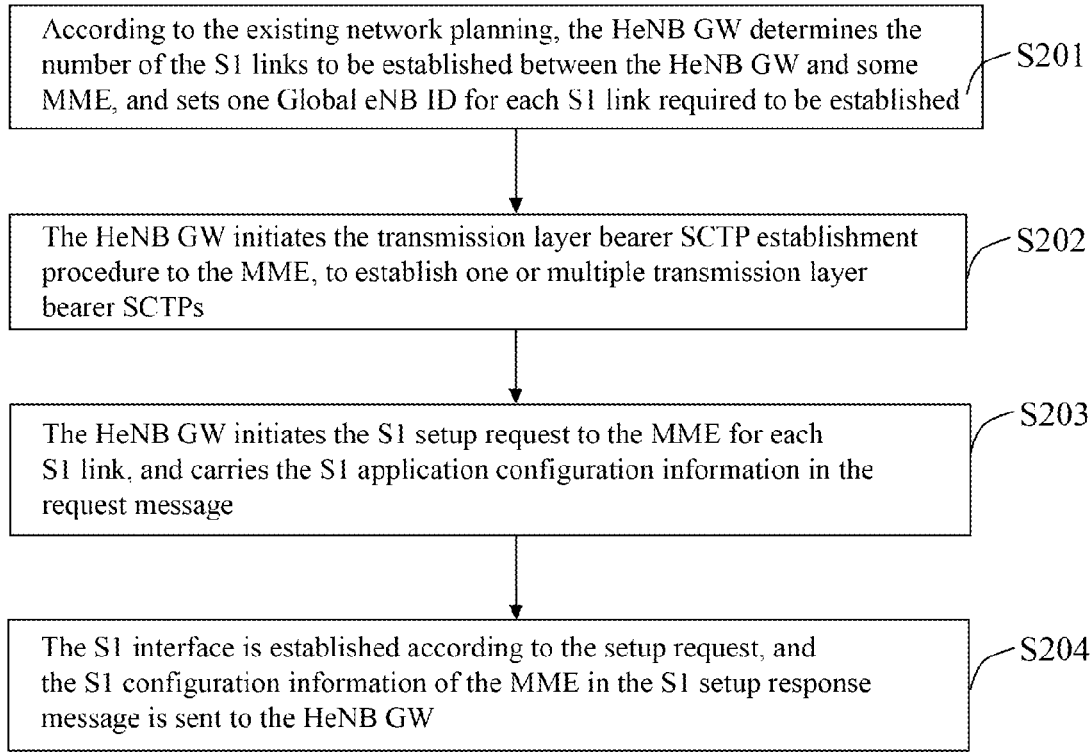
FIG. 4 is a processing flow chart according to the first embodiment of the present document.

FIG. 4 shows that the first embodiment of the present document, where the number of the S1 links required to be established is predicted according to the existing network planning, and the S1 links of that number are established between the HeNB GW and the single MME according to the procedures.

In S201, according to the existing network planning, the HeNB GW predicts the number of the TAC, the CSG and the PLMN required to support, further determines the number of the S1 links to be established between the HeNB GW and the single MME, and sets one Global eNB ID for each S1 link required to be established under the single MME.

Wherein, during the determination of the number of the required S1 links, if the more the number of the TAC, the CSG and the PLMN required to support is, then the more the number of the required S1 links is. For example, the TAC number under the single MME is greater than 256*N, and then the number of the required S1 links is N+1.

In S202, the HeNB GW initiates the transmission layer bearer SCTP establishment procedure to the MME, to establish one or multiple transmission layer bearer SCTPs.

In S203, the HeNB GW initiates the S1 setup request to the MME for each S1 link, and carries the S1 application configuration information in the request message, including the corresponding Global eNB ID, the tracing area code (TAC), the public land mobile network (PLMN), the closed subscriber group (CSG), the default paging discontinuous reception, the eNB name, etc.

In S204, it is processed to establish the required S1 link according to the conventional method for each S1 setup request received by the MME, that is, if the MME allows to establish the S1, then the MME establishes the corresponding S1, sends the S1 setup response and returns the S1 setup response message to the HeNB GW, wherein, it carries the S1 configuration information of the MME, such as, the MME name, the PLMN, the MME group identifier, the MME code word, the relevant MME capacity, etc.; if the MME does not allow to establish the S1 (for example, when the core network does not support the HeNB GW configuration), then the establishment is failed, the S1 setup failure message is returned to the HeNB GW.

Figure 5:
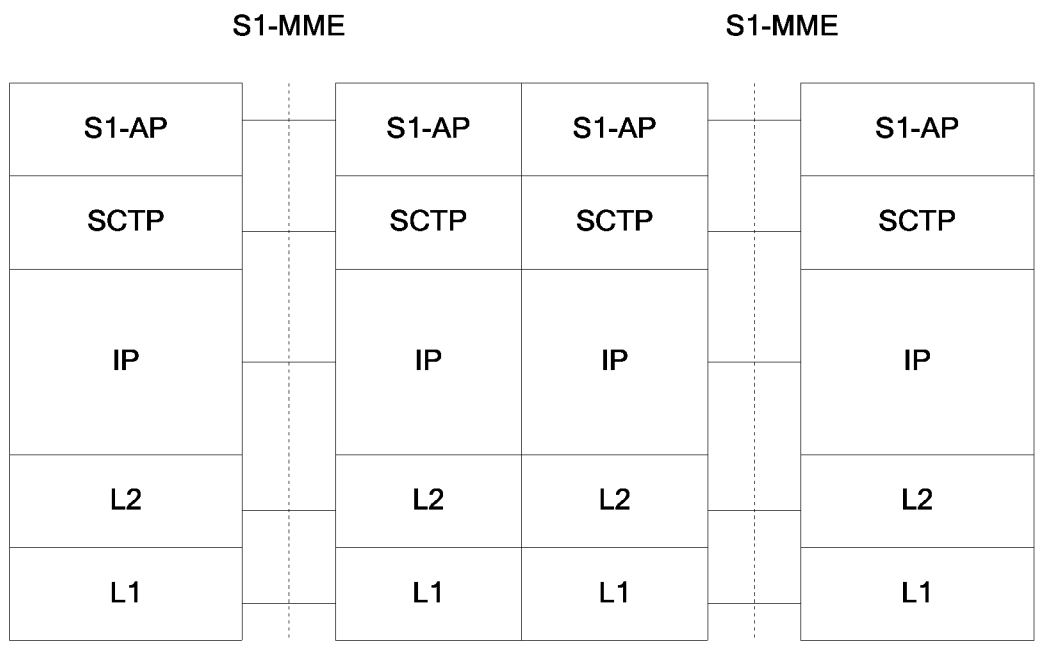
FIG. 5 is a diagram of a protocol stack between an MME and an HeNB in the related art.

Wherein, the stream control transmission protocol (SCTP) provides a steady and ordered data transmission service between two endpoints, the wireless network layer protocol (S1 AP) is the application layer protocol of the LTE system access network and the core network interface S1-MME, to control the transmission of the signaling and the data between the access network and the core network, as shown in FIG. 5, the S1 AP protocol is established on the transmission layer bearer SCTP protocol. In the present embodiment, each S1 link is established on the SCTP through the S1 AP protocol, which can be established on different SCTPs, for example, one S1 link corresponds to one SCTP; and can also be that multiple S1 links are established on different streams born by one same SCTP, which can be set according to the current SCTP transmission capacity selection. The data flow rate of the HeNB GW can be increased through establishing the S1 on appropriate SCTP transmission bearer.

Figure 6:
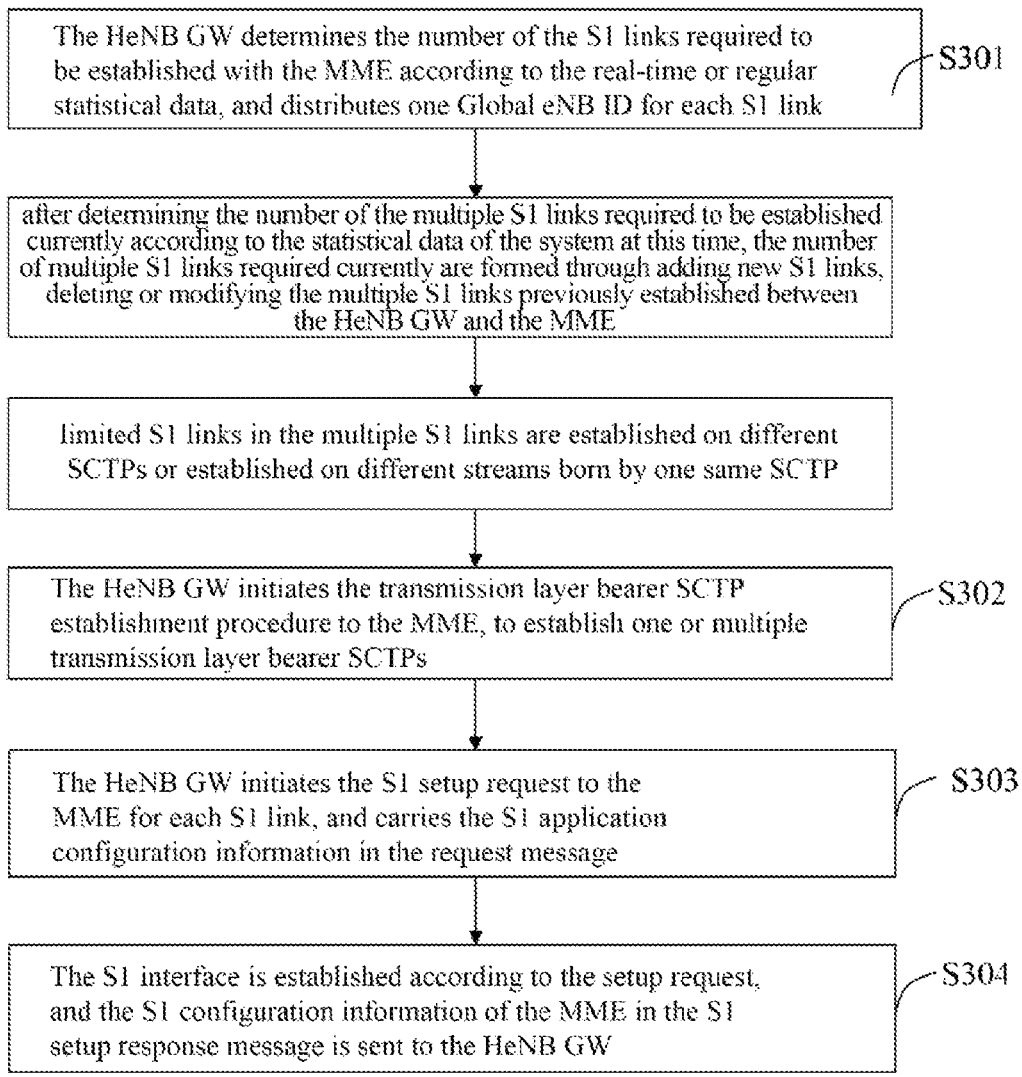
FIG. 6 is a processing flow chart according to the second embodiment of the present document.

Same operation is performed to each MME in the system according to the method of the present embodiment, and multiple SCTP links are established respectively between the HeNB GW and each MME, used for sharing the data transmission of the system. Above, in S101, the HeNB GW determines the number of the S1 links required to be established according to the existing network planning, which is a static configuration, and it also can determine the number of the S1 links required to be established through the dynamic method. FIG. 6 shows the flow chart of a second embodiment of the present document, which determines the number of the S1 links required to be established dynamically according to the real-time or regular statistical data.

In S301, the HeNB GW determines the number of the S1 links required to be established with the MME according to the real-time or regular system statistical data, and distributes one Global eNB ID for each S1 link required to be established under the single MME.

Wherein, the statistical data can be the HeNB number, the number of the users, the signaling flow rate or the packet loss rate, etc., in real time or in the statistical period; the more the data required to be processed are, the more the S1 links that should be established are. For example, if it is found that the TAC number under one single MME after the statistics update at this time is surplus 256*N, then the number of the S1 links at this time is N+1. The advantage of doing it in this way is that, if the Femto base station is added to the system, the number of the SCTP links can be adjusted dynamically in time, to achieve the reasonable number automatically.

As to the one-time statistical data result, the subsequent processing procedures S302-S304 are the same as the S202-S204 in the first embodiment.

After obtaining the statistical data result again, the HeNB GW determines the number of the S1 links required currently according to the updated statistical data, and realizes forming the S1 links of the required number between the HeNB GW and each MME through adding, deleting or modifying the S1 links with each MME, on the basis of last configuration, to satisfy the system resource requirement to the greatest extent under the reasonable precondition. And during the dynamical adjustment process, it can also change the relation of every S1 link and the established SCTP, and selects to establish the S1 on different SCTPs or different streams bore by the same SCTP according to the current SCTP transmission ability, to further increase the HeNB GW capacity.

Figure 7:
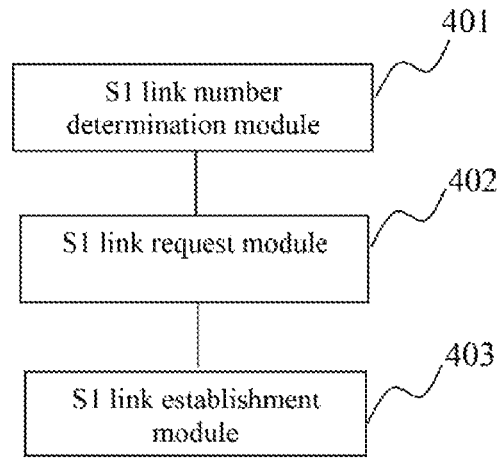
FIG. 7 is a diagram of an apparatus for increasing gateway capability in an LTE standard Femto cell system of the present document.

Further, in order to solve the problem that the HeNB GW capacity in the related art is unable to satisfy the actual networking requirement, the present document further provides an apparatus for increasing gateway capacity in a long term evolution system (LTE) standard Femto cell system, as shown in FIG. 7, the system including: an S1 link number determination module 401, configured to: make a gateway (HeNB GW) determine that multiple S1 links are required to be established between the HeNB GW and a single mobility management entity (MME); an S1 link request module 402, configured to: make the HeNB GW set different Global eNB identifiers (Global eNB IDs) for each S1 link required to be established, and initiate an S1 setup request to the single MME respectively, and carry S1 application configuration information at the same time; and an S1 link establishment module 403, configured to: make the HeNB GW establish multiple S1 links between the HeNB GW and the single MME based on the S1 setup request and the S1 application configuration information.

In addition, the S1 link establishment module is further configured to: after determining the number of the multiple S1 links required to be established currently according to the statistical data of the system at this time, through adding, deleting or modifying the multiple S1 links between the HeNB GW and the MME established previously, form the number of the multiple S1 links required currently. And the S1 link establishment module is further configured to: establish limited S1 links in the multiple S1 links on different stream control transmission protocols (SCTPs) or establish on different streams born by one same SCTP.

By using the above-mentioned apparatus of the present document into the LTE standard Femto cell system, it can realize to establish multiple S1 links between the network gateway HeNB GW and the single MME, to achieve the objective of expanding the HeNB GW capability.

After multiple S1 links are established between the gateway HeNB GW and each MME, one S1 link between the HeNB and the HeNB GW is further required to be established, that is: the HeNB sends the S1 setup request to the HeNB GW, after the HeNB GW receives the request, one S1 link is selected from multiple S1 links which meet a requirement (that is, when the MME supports all or some PLMNs in the S1 setup request message of the HeNB) between each MME and the HeNB GW for the eNB to reside in (if there are multiple MMEs satisfying the requirement, there may be multiple SCTP connections resided in the HeNB finally, used for transmitting the S1 message of the HeNB); and then the S1 link setup response is replied to the HeNB after the residence is successful; and if the residence is failed, then the S1 setup failure message is replied. Wherein, when one S1 link is selected from multiple S1 links to perform the HeNB residence, it should be considered according to the principle of loading balance to preferably select the S1 link of which the current flow rate is smaller or to which the minimum HeNBs are connected to at present to reside. From this, after the HeNB GW receives the paging message of the MME, it can find the HeNB which meets the paging requirement to perform the paging according to the S1 link of the paging message, which can prevent repeatedly sending the same paging message, issued by the MME in other SCTPs, to one same HeNB.

Although for the example objective, the preferable embodiment of the present document is already disclosed, the skilled in the art will realize that various kinds of improvement, increase and displacement are possible, therefore, the above embodiment is not intended to limit the scope of the present document.

INDUSTRIAL APPLICABILITY

The beneficial results of embodiment of the present document are as follows:
1, a method to establish multiple S1 links between the HeNB GW and the single MME is provided, which breaks through the restrictions brought by one S1 link between the HeNB GW and the MME and can improve the capacity of the HeNB GW and meet the networking requirement on the basis of the used protocol;
2, the number of the required S1 links is determined based on the existing network planning, or, the real-time or regular statistical data of the system, which can not only meet the using requirement of the existing network, but also not waste the system resources to establish the idle link;
3, the S1 is established on different SCTPs or on different streams born by the same SCTP according to the current SCTP transmission capability, which further expands the HeNB GW capability and improve the system performance.

I claim:

1. A method for increasing gateway capability in a long term evolution system (LTE) standard Femto cell system, comprising:
a gateway (HeNB GW) determining that multiple S1 links are required to be established between the HeNB GW and a single mobility management entity (MME);
the HeNB GW setting different Global eNB identifiers (Global eNB IDs) for various S1 links required to be established, and initiating an S1 setup request to the single MME respectively, and carrying S1 application configuration information at the same time; and
the HeNB GW establishing multiple S1 links between the HeNB GW and the single MME based on the S1 setup request and the S1 application configuration information.

2. The method for increasing gateway capability in a long term evolution system (LTE) standard Femto cell system according to claim 1, wherein, the HeNB GW determines a number of the multiple S1 links required to be established according to an existing network planning.

3. The method for increasing gateway capability in a long term evolution system (LTE) standard Femto cell system according to claim 2, wherein, limited S1 links in the multiple S1 links are established on different stream control transmission protocols (SCTPs) or established on different streams born by one same SCTP.

4. The method for increasing gateway capability in a long term evolution system (LTE) standard Femto cell system according to claim 1, wherein, the HeNB GW determines the number of the multiple S1 links required to be established according to real-time or regular system statistical data.

5. The method for increasing gateway capability in a long term evolution system (LTE) standard Femto cell system according to claim 4, wherein, after determining the number of the multiple S1 links required to be established currently according to the statistical data of the system at this time, the number of the multiple S1 links required currently are formed through adding new S1 links, deleting or modifying the multiple S1 links previously established between the HeNB GW and the MME.

6. The method for increasing gateway capability in a long term evolution system (LTE) standard Femto cell system according to claim 5, wherein, limited S1 links in the multiple S1 links are established on different stream control transmission protocols (SCTPs) or established on different streams born by one same SCTP.

7. The method for increasing gateway capability in a long term evolution system (LTE) standard Femto cell system according to claim 4, wherein, limited S1 links in the multiple S1 links are established on different stream control transmission protocols (SCTPs) or established on different streams born by one same SCTP.

8. The method for increasing gateway capability in a long term evolution system (LTE) standard Femto cell system according to claim 1, wherein, limited S1 links in the multiple S1 links are established on different stream control transmission protocols (SCTPs) or established on different streams born by one same SCTP.

9. An apparatus for increasing gateway capability in a long term evolution system (LTE) standard Femto cell system, comprising a processor, and a storage device for storing computer executable instructions that, when executed by the processor, cause the processor to perform the steps in the following modules:
an S1 link number determination module, configured to: make a gateway (HeNB GW) determine that multiple S1 links are required to be established between the HeNB GW and a single mobility management entity (MME);
an S1 link request module, configured to: make the HeNB GW set different Global eNB identifiers (Global eNB IDs) for various S1 links required to be established, and initiate an S1 setup request to the single MME respectively, and carry S1 application configuration information simultaneously; and
an S1 link establishment module, configured to: make the HeNB GW establish multiple S1 links between the HeNB GW and the single MME based on the S1 setup request and the S1 application configuration information.

10. The apparatus for increasing gateway capability in a long term evolution system (LTE) standard Femto cell system according to claim 9, wherein, the S1 link number determination module is configured to: determine the number of the multiple S1 links required to be established according to an existing network planning.

11. The apparatus for increasing gateway capability in a long term evolution system (LTE) standard Femto cell system according to claim 10, wherein, the S1 link establishment module is further configured to: establish limited S1 links in the multiple S1 links on different stream control transmission protocols (SCTPs) or establish on different streams born by one same SCTP.

12. The apparatus for increasing gateway capability in a long term evolution system (LTE) standard Femto cell system according to claim 9, wherein, the S1 link number determination module is configured to: determine the number of the multiple S1 links required to be established according to real-time or regular system statistical data.

13. The apparatus for increasing gateway capability in a long term evolution system (LTE) standard Femto cell system according to claim 12, wherein, the S1 link establishment module is further configured to: after determining the number of the multiple S1 links required to be established currently according to the statistical data of the system at this time, form the number of the multiple S1 links required currently through adding new S1 links, deleting or modifying the multiple S1 links between the HeNB GW and the MME established previously.

14. The apparatus for increasing gateway capability in a long term evolution system (LTE) standard Femto cell system according to claim 13, wherein, the S1 link establishment module is further configured to: establish limited S1 links in the multiple S1 links on different stream control transmission protocols (SCTPs) or establish on different streams born by one same SCTP.

15. The apparatus for increasing gateway capability in a long term evolution system (LTE) standard Femto cell system according to claim 12, wherein, the S1 link establishment module is further configured to: establish limited S1 links in the multiple S1 links on different stream control transmission protocols (SCTPs) or establish on different streams born by one same SCTP.

16. The apparatus for increasing gateway capability in a long term evolution system (LTE) standard Femto cell system according to claim 9, wherein, the S1 link establishment module is further configured to: establish limited S1 links in the multiple S1 links on different stream control transmission protocols (SCTPs) or establish on different streams born by one same SCTP.

* * * * *